(12) United States Patent
Doty, II et al.

(10) Patent No.: US 7,945,042 B1
(45) Date of Patent: May 17, 2011

(54) METHOD FOR SWITCHING ACTIVE CALLS

(75) Inventors: Jerry Dwight Doty, II, Dracut, MA (US); Luis A. Viriato, Livermore, CA (US); Ronald Royce Meadows, Milpitas, CA (US)

(73) Assignee: CISCO Technology, Inc., San Jose, CA (US)

( * ) Notice: Subject to any disclaimer, the term of this patent is extended or adjusted under 35 U.S.C. 154(b) by 1523 days.

(21) Appl. No.: 09/753,307

(22) Filed: Dec. 29, 2000

(51) Int. Cl.
*H04M 9/00* (2006.01)

(52) U.S. Cl. ........ 379/271; 379/286; 379/284; 370/229; 370/360

(58) Field of Classification Search .............. 379/284, 379/286, 433.09, 279, 271; 370/463, 225, 370/229, 360
See application file for complete search history.

(56) References Cited

U.S. PATENT DOCUMENTS

| | | | | |
|---|---|---|---|---|
| 5,291,611 A | * | 3/1994 | Davis et al. | 712/15 |
| 5,563,882 A | * | 10/1996 | Bruno et al. | 370/260 |
| 5,581,462 A | * | 12/1996 | Rogers | 701/3 |
| 5,991,263 A | * | 11/1999 | Bales et al. | 370/225 |
| 6,205,557 B1 | * | 3/2001 | Chong et al. | 714/4 |
| 6,347,093 B1 | * | 2/2002 | Reine et al. | 370/463 |
| 6,574,216 B1 | * | 6/2003 | Farris et al. | 370/352 |
| 6,976,062 B1 | * | 12/2005 | Denby et al. | 709/220 |
| 2002/0101605 A1 | * | 8/2002 | Zeck | 358/1.15 |

* cited by examiner

*Primary Examiner* — Ahmad F Matar
*Assistant Examiner* — Karen L Le
(74) *Attorney, Agent, or Firm* — Marger Johnson & McCollom PC

(57) ABSTRACT

A method and apparatus for switching active calls from one entity to another on a network device. The method includes the steps of collecting the call information, designating a second, or target, entity to receive the call, and switching the call. If compression is being used in the call, the method will include the steps of copying the compression dictionary tables and loading the tables in the second entity. The apparatus includes a controller and at least two entities. A connector connects the entity with incoming or outgoing phone calls. The controller switches the active call from a first entity to a second entity.

19 Claims, 1 Drawing Sheet

METHOD FOR SWITCHING ACTIVE CALLS

BACKGROUND

1. Field

This invention relates to telephone switching technology and computer networking technology, more particularly to telephone and internetworking systems that use digital signal processors to handle calls.

2. Background

Some telephone systems use digital signal processors (DSPs) to handle and switch calls between incoming and outgoing digital phone calls and an Integrated Digital Services Network (ISDN). In one example, these processors are contained on a card or circuit board referred to as a MICA, Modem ISDN Channel Aggregation. Some MICA cards are organized to handle several calls per module and contain several modules. A typical example would be a card having 10 modules, each of which can handle 6 modem calls. Typically, each module will contain several DSPs.

A problem occurs when the firmware in the DSP needs to be upgraded. In order to do this, no calls can be active on the module. Typically, the upgrade is performed after all of the active calls have hung up, or all the active calls are terminated. The first option is not much of a problem when there are only 6 calls per module. It can be problematic, but still feasible when there are 12 calls. However, future generations of the modules envision 30 and 60 calls per module, with even more expanded capability in sight. In view of the high number of calls that might be occurring on each module, waiting for a time when there are no active calls might be next to impossible.

Similarly, actively terminating calls on a module to perform the upgrade may not be a solution. With only 6 calls possible to be active, it is possible to terminate the calls and only cause 6 to 12 disgruntled customers. However, disappointing 30 or 60 customers is not really a feasible alternative.

Additionally, a typical access server may contain several modules. Waiting for one of the above events to occur for each module would require a lengthy period of time to complete the upgrade. The longer it takes to wait between modules, the longer the overall upgrade will take.

A method and apparatus that would allow upgrades to be performed without waiting would be useful.

SUMMARY

One embodiment of the invention is a method for switching active calls from one entity to another on a network device. The entity may be a processor, a module or a card. The method includes the steps of collecting the call information, designating a second, or target, processor to receive the call, and switching the call. If compression is being used in the call, the method will include the steps of copying the compression dictionary tables and setting the tables in the second processor.

Another embodiment of the invention is a network device that includes a controller and at least two entities. A connector connects a processor with incoming or outgoing phone calls, where the processor may be the entity or part of the entity. The controller switches the active call from a first processor to a second processor. The second processor may be located on different entities, or within an entity. The entity from which the calls are being switched is freed up for upgrades and other system services.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
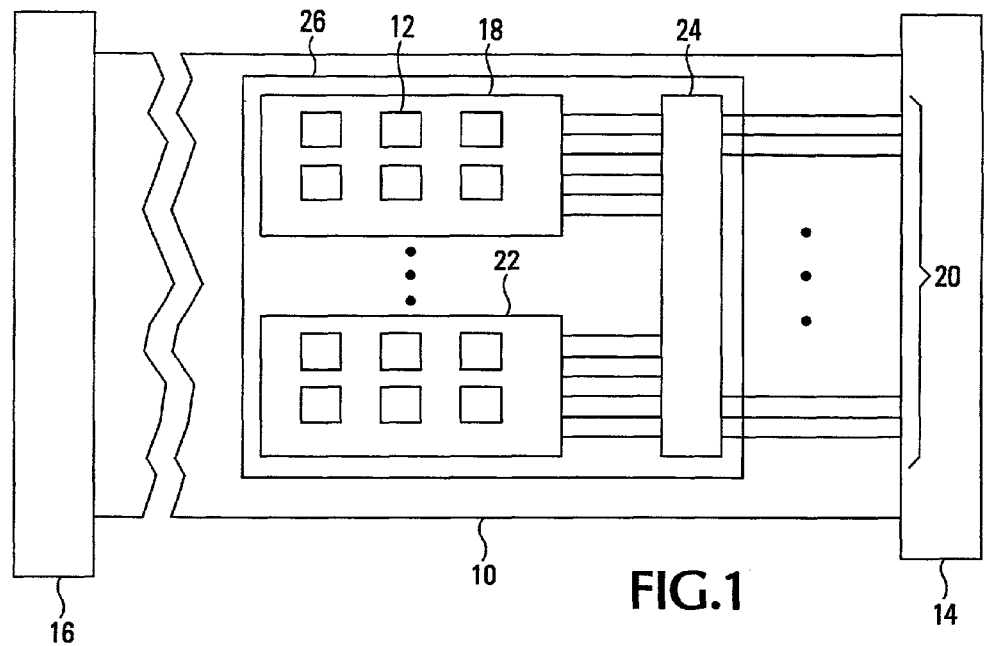
FIG. 1 shows a network device with at least two entities, in accordance with the invention.

FIG. 1 shows one embodiment of a network device, in accordance with the invention. The network device could be of any type that handles phone calls, although the phone calls will typically be digital and the device will interface between the digital phone calls and a digital network. One such device that will serve as an example of such a device is a Modem Integrated Services Digital Network (ISDN) Channel Aggregation (MICA) device. These typically act as an interface between digital calls and an ISDN network, but may also be used on networks using Channel Associated Signaling (CAS).

However, it must be noted that this device is only meant as an example and is in no way intended to limit application of the invention. Other types of calls that can be switched include, but are not limited to, packet voice calls, such as Voice Over Internet Protocol, V.110 terminal adapters, V.120 terminal adapters, fax and modem calls. It is not necessarily limited to digital calls. Channelized T1, or R2 signaling over E1 lines may also be used.

Generally, the device will allow active calls to be switched from one entity to another without dropping the call. Network devices such as these are typically configured with at least one removable card. Each card has several modules, and each modules has several processors. The processors will be referred to here as digital signal processors (DSPs) for convenience, but other types of processors may also be used. With application of the invention, the active calls can be switched between processors, whether those processors are in the same module, in different modules on the same card, or different cards on the same network device. The processors, modules and cards between which calls are switched will be referred to as 'entities.'

The device 10 will have at least one connector, such as 14, that connects the processors that will handle the calls with the phone lines transmitting the calls. It may have a second connector 16. In some architectures, connector 14 may handle only incoming or outgoing calls and connector 16 may handle the outgoing calls. How the calls come into the network device or are sent out of the network device has no real effect on the application of the invention.

The module 18 further comprises a set of digital signal processors (DSPs) that will handle the calls coming in on lines 20. The module 18 may include another processor that controls the various processors in the module. In this case, the method of the invention may be implemented in software running on this processor, which will be referred to as a controller. Alternatively, the controller may be part of the digital signal processor or an external controller, as shown at 24 in FIG. 1. Each module may contain several processors. In most current architectures, each processor typically handles one call, or a part of a call. However, there is no limitation in application of the invention. The module could have several processors, each that handle one call or part of a call, or it could have one processor that handles several calls and every combination between.

The DSPs may be other types of processors or controllers as well, but will be assumed to be DSPs here for ease of discussion. Regardless of how the control functionality is implemented, the functions will be referred to as if there were a separate controller, without any intention of limiting the scope of the invention.

Currently, in order to upgrade an entity on the device, no calls can be active. This requires either waiting until all calls have terminated of their own accord, or terminating the calls. Neither one of these provides an efficient solution to the problem. As the number of calls handled by a particular entity increases, the amount of time waiting for call to terminate increases. Actively terminating the calls is not a good idea for customer service reasons.

Application of the invention will allow the controller 24, however implemented, to switch active calls from one entity to another. For discussion purposes, the entity will be assumed to be a module and the switch will occur between processors on different modules. In this example, if module 18 has an active call and it is time for the software/firmware on that module to be upgraded, the controller will switch all of the active calls to at least one other module. This process will be repeated for each of the active calls, if there is more than one. The active calls could all be switched from one module to one other module, or to individual DSPs in various modules.

There is no real limitation on the destination of the call, only that it be a DSP on the same network device. In this example, where the module 18 is becoming unavailable the call must be switched to a DSP in another module or card. If an individual DSP has become unstable, calls could be switched between DSPs within a module. If an entire card needed to be replaced, the calls would be switched to another card in network device 10.

For ease of discussion, one active call on module 18 will be assumed. In order to upgrade the software/firmware on the module, or to perform other system services, the current active call must be switched. This was not possible prior to the invention. However, application of the invention will result in the call being switched from module 18 to module 22, in this example.

Figure 2:
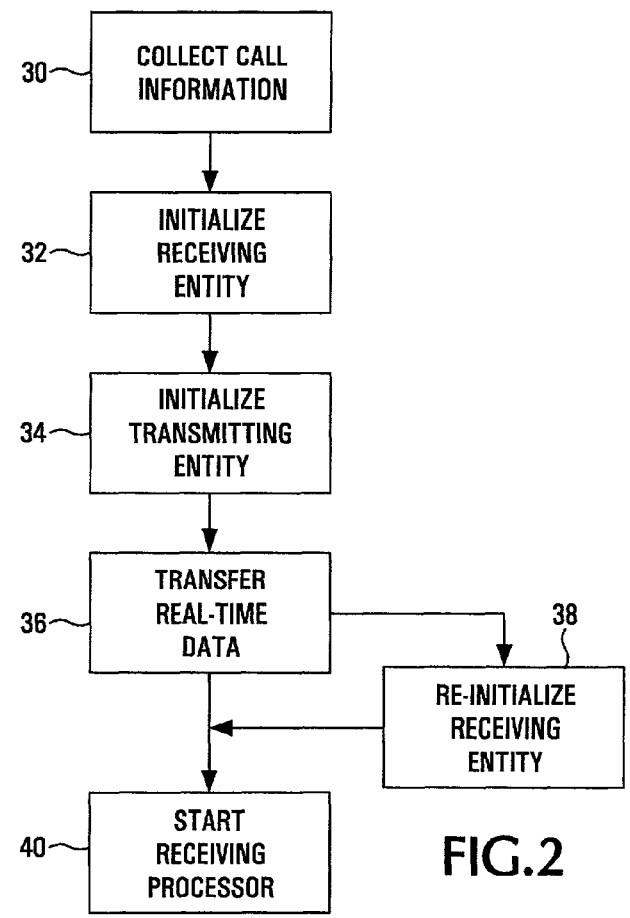
FIG. 2 shows one method of switching active calls from one entity to another, in accordance with the invention.

One embodiment of a method to perform this switch is shown in FIG. 2. Prior to switching a call, necessary call state information about that call is collected at 30. The call state information may include the type of modulation being used and the country code, to name a few. A target processor will be designated and initialized at 32. Part of the initialization process will include initiating a retrain operation on the target processor, if a modem is used in the call, for example. Again, the target processor could be within module 18, in another module, or on another card.

The receiving entity will be initialized to receive the call. If the switch is to another module or card, there may be more initialization necessary than just initializing the target processor on that entity. The transmitting entity will need to be initialized at 32. This may involve suspending or halting the call, without dropping it, to help with the transfer. In the case of a modem call, it could involve a retrain on the transmitting processor.

At 36, any real-time data needs to be transferred to the receiving entity. In the case of a modem call, this will more than likely mean transferring compression tables used to decompress the call data. If necessary, the receiving entity may need to be re-initialized at 38. At that point, the receiving processor will be started at 40. As part of this part of the process, the transmitting processor will then be released, terminating the call on that processor.

The second processor, module or card can be preconfigured prior to actually accepting the call. For example, if the entity is the DSP that will receive the call, it can be preconfigured with all the call state information. It will then not act on that information until the call is actually switched. Similar processes would occur if the entity were the module or the card.

In this manner, active calls can be switched away from an entity in a network device. This frees the entity for software/firmware upgrades and other system maintenance tasks. If the processor is a DSP, the upgrade will more than likely be a firmware upgrade. It is possible that the upgrade will only take the form of software. Regardless, application of the invention frees up the entity for whatever reason desired.

The method of the invention will more than likely be encompassed in some sort of software code included on a computer-readable medium. For example, the capability of switching active calls between entities may be included in an upgrade to the controller or to whichever processors are controlling the routing of the calls. The upgrade may be in a downloadable file or in a DSP image file, as examples.

Thus, although there has been described to this point a particular embodiment for a method and apparatus for switching active calls between entities on a phone interface, it is not intended that such specific references be considered as limitations upon the scope of this invention except in-so-far as set forth in the following claims.

What is claimed is:

1. A method for switching active calls between entities on a network device, the method comprising:
   determining that a time has been reached for an upgrade of firmware on a first processor that is still actively handling calls;
   collecting information about a current call on the first processor while the current call is being processed by a first entity;
   initializing a second processor residing in the network device with the first processor with the information while the current call is being processed on the first processor;
   switching the current call from the first processor to the second processor;
   releasing the first processor from further processing of the call; and
   repeating the switching of the current call from the first processor until the first processor is free from all active calls for maintenance.

2. The method of claim 1 wherein the processors are digital signal processors located within the same module.

3. The method of claim 1 wherein the processors are located in different modules located on the same card.

4. The method of claim 1 wherein the processors are located on different cards in the network device.

5. The method of claim 1 wherein the method further comprises:
   copying compression dictionary tables from the first entity; and
   loading compression tables in a second entity.

6. The method of claim 1 wherein initializing a second processor further comprises initiating a retrain sequence on the second processor.

7. The method of claim 1 wherein the information about a current call includes modulation.

8. The method of claim 1 wherein the information about a current call includes country code.

9. A computer-readable medium, having embodied therein software code that when executed results in:
   identifying that a time has been reached for an upgrade to a first processor actively handling calls in a network device;

collection of information about a current call on the first processor while the current call is being processed by the first processor;

initialization of a second processor in the network device with the information while the current call is still active on the first processor;

switching of the current call from the first processor to a second processor;

direction of the second processor to retrain and accept the current call; and repeating until the first processor is free of current calls.

10. The computer-readable medium of claim 9, wherein said medium further comprises a downloadable file.

11. The computer-readable medium of claim 9, wherein said medium further comprises an image file uploadable into a digital signal processor.

12. A network device, comprising:

at least two processing entities residing in the network device, each able to handle at least one active call;

a connector operable to connect incoming phone lines to the at least two processing entities; and a controller to:

determine that a time has been reached for an upgrade to a first processor that is actively handling calls; and switch each active calls from one entity to another without interruption, and to repeatedly switch active calls on the first entity until the processor is free for maintenance.

13. The device of claim 12 wherein the controller is part of a processor located on one of the entities.

14. A network device, comprising:

at least two means for handling active calls residing in the network device;

a means for connecting the means for handling active calls with means for transmitting phone calls;

a means for determining that a time has been reached for an upgrade to a first processing means that is actively handling calls; and a means for switching each active calls from a first processing means for handling active calls to another processing means for handling active calls without interruption, and for repeatedly switching active calls on the first means for handling active calls and until the first processing means is free for maintenance.

15. The device of claim 14 wherein the device further comprises a modem ISDN channel aggregation device.

16. The device of claim 14 wherein the means for handling active calls further comprises digital signal processors.

17. The device of claim 14 wherein the means for handling active calls further comprise modules located on the same card.

18. The device of claim 14 wherein the means for handling active calls further comprises cards.

19. The device of claim 14 wherein the means for switching active calls further comprises a controller.

* * * * *

UNITED STATES PATENT AND TRADEMARK OFFICE
CERTIFICATE OF CORRECTION

| | | |
|---|---|---|
| PATENT NO. | : 7,945,042 B1 | |
| APPLICATION NO. | : 09/753307 | |
| DATED | : May 17, 2011 | |
| INVENTOR(S) | : Jerry Dwight Doty, Luis A. Viriato and Ronald Royce Meadows | |

It is certified that error appears in the above-identified patent and that said Letters Patent is hereby corrected as shown below:

Column 5, line 26, the word "calls" should be replaced with --call--.

Signed and Sealed this

Twenty-sixth Day of July, 2011

David J. Kappos
*Director of the United States Patent and Trademark Office*